US010873670B1

(12) United States Patent
Schrenkel et al.

(10) Patent No.: US 10,873,670 B1
(45) Date of Patent: Dec. 22, 2020

(54) AUTOMATED COMMUNICATIONS POOL PLAN MANAGEMENT ROBOT

(71) Applicant: Tangoe US, Inc., Shelton, CT (US)

(72) Inventors: Joan Schrenkel, Indianapolis, IN (US); Robert King, Westfield, IN (US); Eric Sendelbach, Indianapolis, IN (US)

(73) Assignee: Tangoe US, Inc., Indianapolis, IN (US)

( * ) Notice: Subject to any disclaimer, the term of this patent is extended or adjusted under 35 U.S.C. 154(b) by 0 days.

(21) Appl. No.: 16/587,966

(22) Filed: Sep. 30, 2019

(51) Int. Cl.
*H04M 11/00* (2006.01)
*H04M 15/00* (2006.01)
*G06Q 30/06* (2012.01)
*H04M 15/36* (2006.01)

(52) U.S. Cl.
CPC .... *H04M 15/7652* (2013.01); *G06Q 30/0629* (2013.01); *H04M 15/36* (2013.01); *H04M 15/80* (2013.01)

(58) Field of Classification Search
CPC . H04M 15/765; H04M 15/7652; H04M 15/80
See application file for complete search history.

(56) References Cited

U.S. PATENT DOCUMENTS

| 7,664,484 | B2 | 2/2010 | Marsh et al. |
| 8,346,212 | B2 | 1/2013 | Breitzman et al. |
| 2014/0179266 | A1* | 6/2014 | Schultz ............... H04L 12/1435 455/406 |
| 2014/0180877 | A1* | 6/2014 | Dotolo ............... G06Q 30/0631 705/26.64 |
| 2017/0201850 | A1* | 7/2017 | Raleigh ................ G06F 3/0482 |

\* cited by examiner

*Primary Examiner* — Barry W Taylor
(74) *Attorney, Agent, or Firm* — St. Onge Steward Johnston & Reens, LLC

(57) ABSTRACT

A system and computer implemented method which determines usage and available rate plans, at least some of which are pool eligible. Based on expected usage for a billing cycle, the system and method modifies rate plans for one or more devices to migrate devices in and out of the pool(s) and/or modify plans and data available to the pool in order to reduce cost of telecommunications services for the devices.

36 Claims, 10 Drawing Sheets

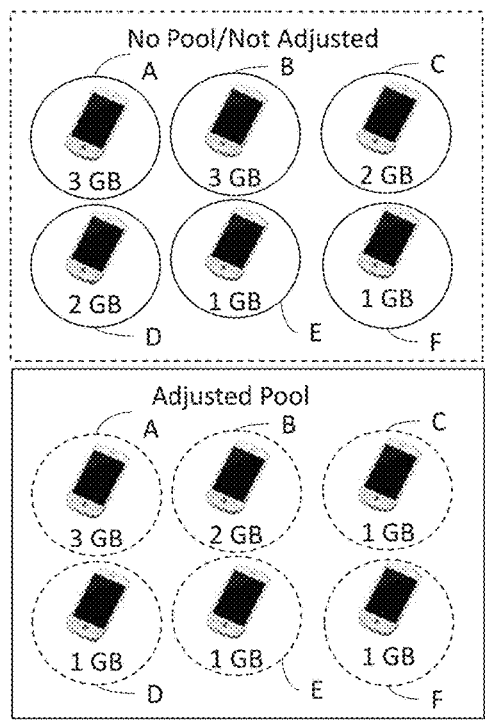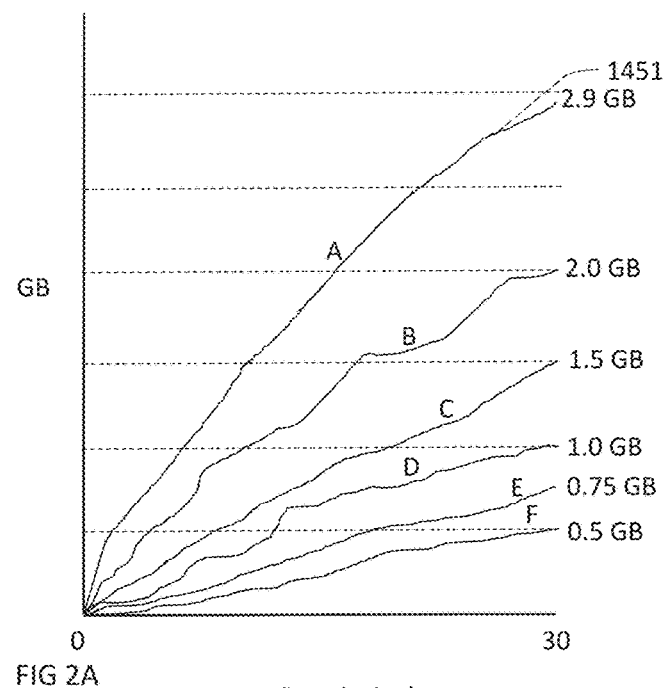
FIG 2A

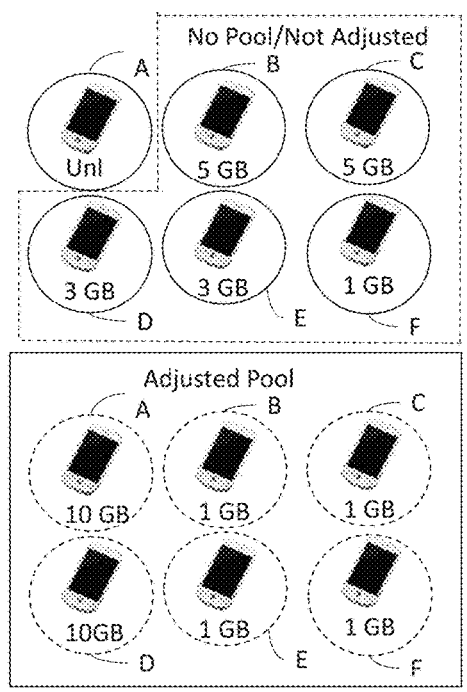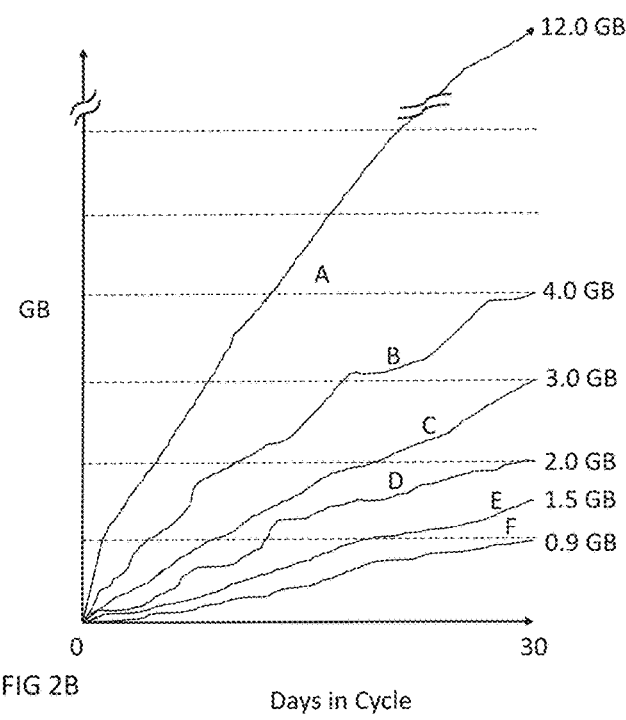
FIG 2B

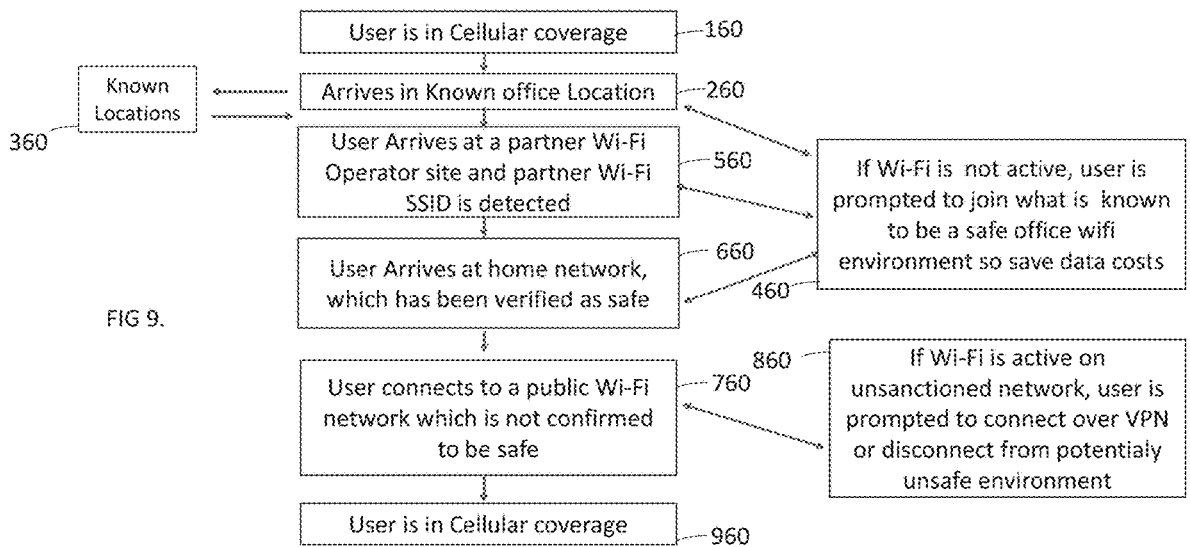

AUTOMATED COMMUNICATIONS POOL PLAN MANAGEMENT ROBOT

FIELD OF THE INVENTION

The present invention relates to systems and methods for managing and modifying telecom plans for devices, and in particular the management of a shared pool of data between multiple subscribers. The system utilizes algorithms, incorporating machine learning to optimize telecom expense management by taking automated actions such as right sizing pool plans dynamically within the billing month.

BACKGROUND OF THE INVENTION

Cellular data usage is among the many necessities in today's business world as connectivity of devices including mobile phones, tablets, and computers is essential for communications.

As network speeds continue to increase, applications have become more feature rich incorporating multi-media such as videos, images and audio. These applications have become increasingly large consumers of data as the size of data transferred increases as these data types are consumed.

Additionally, the growing trend of connected devices such often referred to as the IoT (internet of things) connecting equipment and sensors to the internet is also an increasing consumer of cellular data.

Companies must take this increasing traffic utilization into account when negotiating data plans with their communications providers and plan for growth and increased usage over time.

With most carriers, data costs are structured in a way that you pre-buy a certain amount of data, say a 1 GB (gigabyte) plan allowing you to use up to 1 GB of data in a billing cycle, typically a month. If you go under this amount, you may lose this available bandwidth although some providers may allow you to carry it forward into the next month. Plans of course vary by carrier and are often differentiators of services between competing carriers and adjusted to remain competitive and to obtain business. In many cases, corporate plans are further customized and negotiated for key accounts based on their needs.

When exceeding the data usage carriers often impose penalties in the form of excess data usage charges and apply higher data rates. These may be applied to for all data above and beyond the allowable plan allotment or limit. This is often ten times or even more expensive than the original data amount, and more expensive than it would be to move up to the next tier of available plan As a concrete example, consider that a carrier offers three plans consisting of a 1 gb, 2 gb and 5 gb data allotment. Say that these plans cost $40, 60$, and 100$ respectively. Obviously, if one were to use less than 1 gb it would make sense to purchase the 1 gb plan or the minimum size. Assuming we used up the whole 1 gb we could say that each 100 MB costs us $4 or that we were paying 4c per megabyte. If we use less the cost remains at the fixed $40 and our cost per MB goes up which of course makes it important to purchase a right sized plan. This plan may however have an overage charge of 40c/megabyte or 10 times the typical cost of the data in the plan. In such a case, should one inadvertently use 2 GB while on the 1 GB plan (an additional 1000 MB) the cost would be an additional $400 making the overall cost $440 instead of the $40 plan cost. As one can see from this example, it would be wise to know one's usage and to purchase a 2 gb plan for $60 instead.

In many cases for corporate users, since usage always seems to vary by month for individual users' carriers offer bundles including the notion of a pooled plan in which a large data pool is shared as part of an overall corporate plan. Specifics can vary from carrier to carrier. If we take an example of a carrier offering 1, 3, and 5 GB plans, consider now a company with 300 users of which 100 are on each of the plans. If we were to pool these plans together now, we would end up with 100×1+100×3+100×5 or 900 GB in total across 300 users or the equivalent of 3 gb each. Now, if a single user went over (even by as much as 1 GB as in the illustration above), we would not incur any additional charges or overage charges as long as the overall pool remained below the 900 gb that was put in place The description above is simplified in that certain plans are only available for certain devices, so it may not be as simple as just putting the users in one of three plans. Certain tablet devices or IoT devices may have specific plans with low cost and minimal usage that can also be added to pooled plans. Consider the case where a $2/month 100 mb plan applied to 50 IoT devices with a 50c/mb overage charge is combined with a low usage mobile phone plan able to take on a 5 GB plan at a 60$ cost. The 50 devices would only cost $100 a month, but if all of them went over by 100 mb (5 GB) the cost would be $2,500. By adding the low use mobile phone plan for $60 we could mitigate this overage with a monthly cost of $160 instead. Many combinations such as this based on device type, availability of plans, variability of usage, among other factors must be considered and, in some cases, can be negotiated with the carrier.

While the notion of averaging out across users makes this a reasonable approach, there are none the less some month to month variances in usage. With a pool it is expected that some devices will use less data while others use more in a given month thus balancing out the overall amount. It may be difficult to predict these large usages and the variance from month to month can vary with both corporate and personal matters. More and more, even while devices are deemed corporate, employees do tend to use them for both corporate and personal use. Outside factors like big news stories, or popular events causing a lot of media streaming can quickly up the usage of many users and thus affect the overall pool size of a company. Corporate initiatives such as video training or other broadcast events to staff may also drive up usage, as may a new project or a new customer triggering such traffic to be used in communications. In the examples used above for overages, consider now 100 users all driving up their 1 GB plans to 2 GB, instead of a $400 surprise charge we would be facing a $40,000 charge.

To mitigate these issues, it may be desirable to build in a buffer, for example, adding 20 percent of the expected maximum usage to account for any overages and to ensure that overage charges will not kick in. This is an attempt to overcome the potential for incurring large overage charges. This extra 20 percent will add monthly cost to the company, but it is considered as an insurance policy against the potential for costly overage. In many months, usage may come in well below the expected maximum and the company may be paying for 30% or even 40% more data than they need in a given month.

Roaming charges for out of country cellular use are also a potential high-risk area that can bring about overage costs. Roaming traffic can also be drastically more expensive than local traffic. Carrier offer roaming plans, features, and options to mitigate this cost. Preventing roaming without such an option or plan is another important area to address when mitigating overage costs.

It would thus be very beneficial to have a way to track the actual usage of a company and determine how it fits into the current pool. It would be extremely beneficial if this pool could be adjusted automatically before the billing period closes to account for any overages or underages and to have the optimal pool size allocated in any given month based on actual and measured usage extrapolated to the end of the month.

SUMMARY OF THE INVENTION

It is therefore an object of the present invention to provide a system and method which monitors telecommunications usage and automatically modifies telecommunications rate plan to appropriately size plans to pooled usage.

It is another object of the invention to retroactively changes telecommunications plans for devices to achieve cost savings during billing cycles.

It is another object of the invention to provide a system and method for right sizing the pool for a given company month to month within the month before the bill is issued.

These and other objects are achieved by providing a system and computer implemented method which determines usage and available rate plans, at least some of which are pool eligible. Based on expected usage for a billing cycle, the system and method modifies rate plans for one or more devices to migrate devices in and out of the pool(s) and/or modify plans and data available to the pool in order to reduce cost of telecommunications services for the devices.

In one aspect a system is provided for monitoring telecommunication device usage and modifying telecommunications rate plans and usage pools. The system includes a computer having software executing thereon. The software queries telecommunications rate plans to determine rate parameters thereof, at least one of the rate plans includes a pool of multiple devices which share a quantity of telecommunications resources based on data usage of the multiple devices associated with the pool. Each of the plurality of telecommunications rate plans is associated with one or more types of eligible devices for the rate plan. The software determines a historical usage profile for the devices and the software, based on the historical usage profile, matches a selection of the devices to the pool. The software transmits the selection to a telecommunications provider server via a network such that a telecommunications provider associates the selection with the pool. The selection is matched at least in part based on the software determining a device type for each of the plurality of devices based on an operating system identifier determined by the software over a network connection between the computer and the device and the software determining that the device type is an eligible device for the selected telecommunications rate plan. The software monitors telecommunications usage of the plurality of devices using telecommunications resources and based on the telecommunications usage thereof and the pool to which the plurality of devices are matched, and the software modifying the selection of the one or more of said plurality of devices at the telecommunications provider server via the network based on the monitored telecommunications usage and the rate parameters in order to reduce telecommunications cost for the plurality of devices by modifying the rate plan of at least one of the devices.

In certain aspects the selection of the devices at the telecommunications provider server makes the modification retroactive to a beginning of a billing cycle for the devices. In other aspects the software transmits a command to change a telecommunications plan of one or more of the plurality of devices in order to modify the selection of the one or more of said plurality of devices. In other aspects the software receives a confirmation from the telecommunications server in response to the command. In other aspects the software sends a query to one or more telecommunications provider servers in order to query the plurality of telecommunications rate plans. In certain aspects the software monitors a rate change over time in telecommunications usage for each of the devices and based the rate change in telecommunications usage for the selection of devices as compared to a threshold, the software modifies the selection of the one or more of said plurality of devices. The threshold is indicative of usage during a time period for a billing cycle of a telecommunications provider associated with the pool. In other aspects, based on the monitored telecommunications usage an expected usage for each of the devices is determined and the rate plan for each device is selected such that a sum total of data allotted to the rate plans for the devices is more than a sum total of expected usage. However, at least a first one of the devices uses more data than the rate plan to which that device is associated. In other aspects, the software modifies the selection of the one or more of the devices by the software identifying the plurality of devices associated with an entity and determining a current telecommunications rate plan for each of the devices, at least two which are associated with the pool. The software matches a selection of the devices to the pool based at least in part on an anticipated reduction in cost for the plurality of devices and a type associated with each of the devices for the type being eligible for the pool. The matching by the software modifies which of the devices are associated with the pool and a rate plan for one or more of the devices based on the monitored telecommunications usage and the rate parameters in order to reduce telecommunications costs for the devices such that the software communicates with a telecommunications provider server over a network to implement the modification to the matched rate plan for the one or more of the devices.

In other aspects, upon modification of the selection of devices associated with the pool, the software selects one of the plurality of telecommunications rate plans for a device moved out of the pool. In other aspects, upon modification of the selection of the one or more devices associated with the pool, one or more of the devices associated with the modified selection changes telecommunications provider.

In other aspects the software modifies the selection of devices by the software determining a current rate plan for each device and the software determines which of the devices are associated with the pool and which of the devices are not associated with the pool, if any. The software, based on a selected time in a billing cycle for a telecommunications provider, determines an expected usage for the devices for the billing cycle based on usage which has occurred between a beginning of the billing cycle and the selected time. The software further determines from the rate plans, a selected rate plan for each device associated with the pool by iteratively modifying one or more of the selections until a cost based on the expected usage is minimized.

In other aspects a system is provided for monitoring and modifying telecommunications usage pools for telecommunications devices. The system includes a computer with software executing thereon, the software queries a plurality of telecommunications rate plans to determine rate parameters thereof and at least one of the rate plans relates to a pool of multiple devices which share a quantity of telecommunications resources based on usage of the multiple devices associated with the pool. The software identifies a plurality of devices associated with an entity and determines a current telecommunications rate plan for each of the devices, and at least two of the devices are associated with the pool. The software monitors telecommunications usage of the plurality of devices using telecommunications resources and based on the telecommunications usage thereof, matches a selection of the one or more of the devices to the pool based at least in part on an anticipated reduction in cost for the devices and a type associated with each of the devices with the type being eligible for the pool. The matching by the software modifies which of the devices are associated with the pool and a rate plan for one or more of the devices based on the monitored telecommunications usage and the rate parameters in order to reduce telecommunications costs for the of devices such that said software communicates with a telecommunications provider server over a network to implement the modification to the matched rate plan for the one or more of the devices.

In certain aspects, the implemented modification is made effective as of a beginning of a billing cycle associated with the monitored telecommunications usage for the billing cycle which has not yet ended. In other aspects, the software matches a plurality of device types to different rate plans which are associated with the same pool such that at least one device type is ineligible for at least one of the rate plans associated with the same pool. In certain aspects, the type is determined by the software communicating with each of the plurality of devices over a network to determine an operating system associated with each device. In other aspects, the software monitors a rate change in telecommunications usage per time for each of the devices and based the rate change in telecommunications usage for the selection of the one or more of the devices as compared to a threshold, the software modifies the selection of devices. The threshold is indicative of usage during a time period for a billing cycle of a telecommunications provider associated with the pool.

In other aspects a system is provided for monitoring and modifying telecommunications usage pools associated with devices. The system includes a computer having software executing thereon, the software is in communication with a telecommunications server in order to receive data therefrom. The data is indicative of telecommunications usage of a plurality of telecommunications devices. The software queries a plurality of telecommunications rate plans to determine rate parameters thereof. At least one of the rate plans relates to a pool of multiple devices which share a quantity of telecommunications resources based on usage of the multiple devices associated with the pool. The software determines a current rate plan from the rate plans for each of the devices and further determines which of the devices are associated with the pool and which of the plurality of devices are not associated with the pool, if any. The software, based on a selected time in a billing cycle for a telecommunications provider associated with the telecommunications server, determines an expected usage for the plurality of devices for the billing cycle based on usage which has occurred between a beginning of the billing cycle and the selected time. The software determines from the rate plans, a selected rate plan for each devices associated with the pool by iteratively modifying one or more of the selections until a cost based on the expected usage is minimized.

In certain aspects the selections are determined by the expected usage is closest to, but without exceeding a sum total of usage allotted the pool based on the rate plans selected. In certain aspects, the selection is determined by a ranking of charge per unit of telecommunications service usage and based on the expected usage and the ranking, the software selects a rate plan for each device associated with the pool based on a lowest charge per unit in the ranking and modifying the selection to a higher ranked charge per unit based on the expected usage exceeding a sum total of usage allotted to the pool based on the rate plans selected.

In other aspects a method is provided for monitoring data usage of a plurality of telecommunications devices and modifying rate plans thereof and includes one or more of the steps of: gathering data usage information via computer with software executing thereon by communicating with a telecommunications server associated with a telecommunications provider, the data usage indicative of data usage of a plurality of telecommunications devices; determining via the software a plurality of rate plans available from said telecommunications provider and which of the plurality of rate plans are associated with each telecommunications device, two or more of said rate plans being associated with a pool of shared telecommunications usage and two or more of the plurality of rate plans having a cost and a data limit associated therewith; determining based on historical data usage of the plurality of devices and a time relative to a billing cycle, an expected usage for the billing cycle; modifying one or more rate plans associated with the telecommunications devices based on the expected usage as compared to a sum of data limits for the modified rate plans associated with the telecommunications devices such that a total cost is minimized; migrating the devices in and out of telecommunications usage pools in accordance with the modified rate plans at the telecommunications server. In certain aspects, the data usage information contains historical data usage.

Other objects of the invention and its particular features and advantages will become more apparent from consideration of the following drawings and accompanying detailed description.

BRIEF DESCRIPTION OF THE DRAWINGS

FIGS. 2A and 2B show how expected usage and pool selection is determined in accordance with FIGS. 1A-B.

FIG. 9 Depicts warning/best practice based on non-active wi-fi network.

DETAILED DESCRIPTION OF THE INVENTION

Figure 1A:
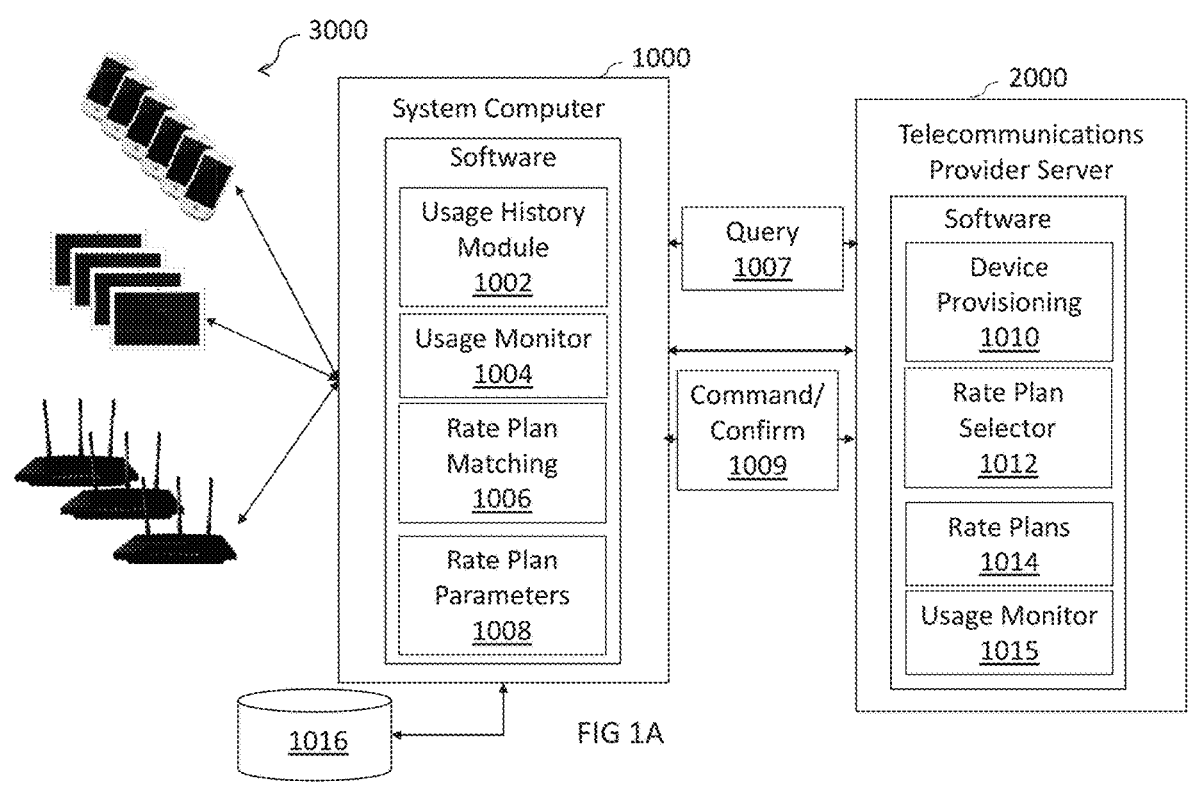
FIG. 1A is a block diagram according to the present invention.

Other aspects and features of the present invention will become apparent from consideration of the following description taken in conjunction with the accompanying drawings.

Referring now to the drawings, wherein like reference numerals designate corresponding structure throughout the views. The following examples (as well as the foregoing) are presented to further illustrate and explain the present invention and should not be taken as limiting in any regard.

The present invention is directed to systems and methods for managing telecom expense management invoices, and in particular the notion of pooled plan management. The system optimizes telecom expense management by right sizing pool plans dynamically within the billing month. Further methods are employed to minimize usage by attempting to modify user behavior.

A robotic software program runs autonomously and continuously in the background collecting data about devices and their current usage. This software program may be knowledgeable about the devices, the assigned plans and the carriers with which they operate, as well as the users and the corporate hierarchy and policies to whom the devices and employees belong.

Current usage is captured and collected through various means including the interfacing with carrier billing systems and web interfaces showing usage data for an account, collecting data directly from the devices or from other mobile device management systems.

Roaming indications are received from both travel systems as well as the devices themselves when they register on external networks or report location information consistent with roaming. Location information can include indications from built in GPS circuitry or other location type information such as proximity to cell-towers, signal triangulation, Wi-Fi SSID identification among other methods.

Further, when locations are correlated with known locations such an office location, additional data reduction strategies such as suggesting to users that they switch onto a known and secure Wi-Fi signal from a corporate office. Similarly, when subscriptions are provided to popular Wi-Fi services such as Boingo for example, similar notifications can be used to attempt to off load some data traffic from the mobile network to a free or separately paid for Wi-Fi system. When these systems are also paid for and usage limits are applied, the system can apply logic to load balance these plans so as to minimize overall cost across plans.

As a further strategy to reduce travel related mobile phone costs, integration with travel booking and approval systems such as concur can give indications of users that have upcoming international travel plans. A cross check on these users and their current subscriptions can indicate when and if adding roaming options or packages for the trip would save in costs. This may depend on the type of trip and the usage patterns of the individual. Pre-buying a roaming plan is often the most economical way of handling business travel.

In some cases, carriers and operators force one to turn on a roaming plan which sticks and adds cost for subsequent months. In these cases, the system also looks for return dates and for when the user is known to have returned to their home country in order to make a decision about turning off the option. If the same user has additional trips planned that are visible in the travel booking system, a decision to keep the plan on rather than switch it off and back on again may be made. In some cases, keeping plans for longer periods may also bring discounts.

Another situation may involve a user travelling on personal vacation while carrying a corporate phone. Here a GPS based travel indication may detect this travel and since there was no planned travel in the business travel booking system, other options may be run such as providing warning to the user about personal usage, perhaps purchasing a roaming package and applying a corporate policy to either personal or business payment for such a plan. The end result is to save corporate costs for the plan and if the policy is to have the company pay for all mobile phone bills regardless of whether travelling on business or pleasure, the system can align its actions with this policy.

One important note about individual users and plan management should be made here also. Most users, especially at a corporate level, have no idea about which plan they have, how much it costs, and what the limits are. They probably have no idea who in the company is managing the plan or paying for it. In many respects this is as it should be since these users view their mobile phone simply as a tool provided by the company to fulfill their business purposes. In such a context, one cannot expect these users to be conscientious about notifying someone about upcoming travels, or carefully tracking their usage. It is simply not practical. For this reason, a system that does this work in the background and manages these plans independently is essential.

Some other examples of situations when it comes to pool plan management include the following
 a. Large users may be moved out of the pooled plan and onto unlimited plans. These plans are not allowed to be in a pool (not pool eligible).
 b. Small users, using much less than the lowest pool eligible plan may also be moved out of the pool onto small plans or pay as you go plans
 c. The detection of zero use devices, often left behind by those leaving the company, can also be reallocated or removed from any pool
 d. In some cases, separate pools can be created with specific groups of users (for example one group that may be roaming, others that do no roaming). These groups are dependent on the offerings available from the carrier. In most cases, a single group offers the most discounted pricing due to volume.
 e. Stolen and lost devices must also be deactivated and removed from a group as replacements are brought in. These may be devices or even SIM cards that have been removed and reused elsewhere.
 f. Extreme cases where every user is already in the highest allocation plan within the pool and no adjustment is possible may be faced. In such cases, moving people out of the pool or paying an overage fee may be inevitable
 g. Similarly, extreme cases where everyone is already in the lowest tiered plan in the pool and no adjustment is possible may result in simply having a fixed pool plan cost based on the lowest offered plan. In some cases, taking people out of a pool to lower priced non pool eligible plans may be possible.

While much of the pool allocation is done in month and pools adjusted within the given billing month, the system can identify trends such as increasing usage, increasing types of usage (more texting, more VoIP calling). In such cases, new pools or new pool types can proactively be explored to ensure the overall pool is also the most beneficial and economical for the group.

In some cases, these usage trends can also bring about some security related anomalies which may trigger further investigation. Examples include large transfers of data off hours or large changes in user usage behaviors. There are many possible explanations for such changes but depending on the nature of the company and the data involved these changes may merit further research by security personnel.

Additionally, policies about how to handle devices and plans can be built into the system for events such as people changing departments, getting promotions with added responsibilities, added travel, or for those leaving the company. In the last case these processes may also involve deactivating and wiping devices.

While the system is intended to run automatically in the background and look for savings opportunities adjusting the plans dynamically, it is also possible to access the system through a console and run the analysis manually. While in a typical automatic mode, the system will run a few days before the plan renewal date or the end of the billing cycle and thus predict the usage for the next few days to come up with a total, when running manually mid-month the variance of what the predicted usage for a full half month will be can also vary to a larger degree. Nevertheless, for some predictive analysis, a forecast can be made, and the analysis can give us an indication of upcoming plan cost for a month. As the month advances, the accuracy naturally increases due to less variability in the shorter remaining time period.

One should also note that for many companies, there is not just one pool plan with a single date. Some global companies may have dozens of carriers for their many offices across the globe and the system will have to run each of the analysis separately for each carrier depending on the individuals in these plans, the carrier offerings, and the plan dates. In some cases, where employees are frequent travelers, an analysis can also be made as to which carrier and which plan would be the most economical for these users depending on their usage patterns.

Further, in the case of many large companies, custom plans can be setup and offered by the carriers in-order to obtain the business of the company. These can offer special discounts and usage profiles that are tailored to meet the needs of the company profile. In such negotiations, the knowledge of how much and what kind of data pools are needed can become a very desirable input to get the best plan and the best deal possible.

While many carriers offer the in-month right sizing of plans, in some cases carriers may not allow this. In such cases, the immediate benefits of dynamic in month change and adjustment are lost, but even in these circumstances the system can be used to better predict usage for subsequent months.

In one embodiment, the system determines the availability of plans with a given carrier, by obtaining a catalog from the carrier. This is done through an available API (application programming interface) when available from the carrier or it may be derived from a sent file. This catalog contains all the necessary information around the availability of plans, which plans are compatible with which devices, as well as relationships between devices and accessories as well as plans and features (such as roaming add-ons which may affect the data related costs).

The catalog is often a complex relationship between the above components in that there are many interdependencies. In many cases plans are only available for certain device types (example iOS devices), in other cases plans may be specific to certain device models (example Samsung Galaxy X). When determining the most suitable and cost beneficial plans, this compatibility must be taken into account.

With larger customers, it is common to see carriers offer custom plans as a negotiating tactic to win large amounts of business. This leads to the catalog being very specific to each customer.

Further, as the catalog is updated it may happen that the plan we currently have is no longer available. In such cases, the carrier will typically grandfather this plan for those that are using it. In some cases, after some period of extension, the carrier may force the user to switch plans or may change the pricing of the grandfathered plan. This must be taken into account when making the decision to change a plan, knowing that there is no way to return to this plan. For example, if the grandfathered plan was very good, we may decide not to switch out to a lower cost plan even if it means some savings in a given month. We may opt instead to make adjustments to the pool using other devices so as to maintain access to the grandfathered plan as long as possible.

The catalog information is one important piece that determines and describes the details behind what is available to the users at a given company which is running the system. This catalog along with the current plans in place (as those plans will no longer appear in the catalog received) makes up the set of choices available for the devices when attempting to calculate the optimal plans and whether or not to make any adjustments. As previously mentioned, it is understood that the grandfathered plans are only available to the devices which are already subscribed to them and once we change those plans it will no longer be available to them either. This catalog can be accessed through an API with the telecommunications (carrier) server.

In addition to the catalog, the system must periodically retrieve the actual usage off the devices throughout the billing period to make the determination of where they are with regards to usage within their existing plan limits.

In one embodiment, the system is able to access the companies account information through a software portal provided by the carrier or service provider that supplies the plans for data usage. The plan information can thus be gathered for the company devices. In most instances the current usage can also be read from such a portal, in some cases to the last day, in other cases to within near real time.

In another embodiment, the system can interact with a mobile device management system (MDM) in order to query usage information from each device.

In yet another manifestation, the system can interact with an agent or application, or function on the device itself to gather this data about current usage.

Devices include of mobile phones, tablets, but also include computers with embedded network cards, IoT devices and sensors, and any and all devices that can continue to the data utilization available in the corporate data pool plan. In certain cases, devices may not be pooled together with different kinds of devices. For example, tablets and Wi-Fi hotspots may be associated with separate pools/pool eligibility and different plan options.

With knowledge of the plan including the limits of usage, the dates the plan is effective the system can take the aggregate usage and compare this to what the plan limits are. When run before the plan expiry date, the system can extrapolate the usage out to the end of the plan date estimating the expected usage in a given plan period, typically a month.

While the offerings vary from carrier to carrier, there are generally one or more plan options available to individual devices that are included in the plan. In a simple example with a single carrier and all devices being the same, the carrier may offer three pool eligible plan types of 1 gb, 2 gb, and 5 gb, typically with increasing cost, for the given device type and each device in the pool can be assigned on of these plans based on expected usage. The carrier may also offer other plans such as unlimited plans and low usage plans, but not offer these as pool eligible.

These individual plans are thus added up to make the overall data usage in the pool. For example, a pool with 100 devices of 1 gb plans each would create a pool of 100 gb.

In one embodiment, the system looks for months that are below plan. Assuming that the system has collected the actual in month usage and has now extrapolated the usage to the end of the plan period and determined that the usage will be smaller than the maximum usage in the pool. This suggests that the company will be paying for a larger pool that that which is required. The system then moves some of the devices with less usage from a larger to a smaller plan, such as moving them from a 5 gb to a 2 gb or even 1 gb plan. Such a move would lower the pool size to be in line with the actual expected usage and would also reduce cost.

In another embodiment, the system looks for months that are above the plan and risk having higher rated overage costs. This can account for business spikes that are to be expected annually at busy times, for example a holiday season or high peak travel times. While the carriers offer reduced pricing for data pools, if one exceeds the usage allocated to a pool and goes 'over' the allocation, the data is much more expensive, and the overall cost will become much larger than the typical pool cost. Assuming that in such a scenario, the system has collected the actual in month usage and has now extrapolated the usage to the end of the plan period and determined that the usage will be higher than the maximum usage in the pool. This suggests that the company will be paying overage costs for a smaller pool than that which is required. The system then moves some of the devices with larger usage from a smaller to a larger plan, such as moving them from a 1 gb to a 2 gb or even 5 gb plan. Such a move would increase to cost of the pool plan as the size would be increased, but such an increase would still remain smaller than the cost of a potential overage with the higher data rates.

In yet another embodiment, the systems and methods may find outlier devices with very little or very large usage and move them out of the pool entirely to either a small plan or an unlimited plan respectively. Such a move would reduce the overall pool size but would also remove the large outliers in the plan pushing the whole pool higher and would remove the low usage devices that had a larger than desired plan, even at the lowest offering which is eligible to be in the pool.

While such adjustments to the pool are beneficial and help to right size the pool to a given month based on actual usage, the system may also discover other factors that could also reduce usage of individual devices.

In one embodiment, the system may detect that a particular device is in an office environment either through the detection of Wi-Fi SSIDs or through location awareness and detect that while a secure and sanctioned Wi-Fi network is available, the device is still communicating on Cellular thus taking bandwidth from the pool. In such a case, the system may make recommendation to the user, may report the event to a supervisor, or may even prompt the user to turn on Wi-Fi or do so automatically.

In another embodiment, the system may detect large transfers, after hours transfers, or particular types of traffic. In such an embodiment, where a corporate policy states that certain applications are not considered corporate or sanctioned to be used by corporate devices, the system could warn the user, raise an alert with a supervisor, or even prompt the user to exit the application or even block the traffic from taking up bandwidth from the pool.

In another embodiment, when the catalog is specific to each customer. The system can be used by the customer to determine plans which would be optimal for the user pool when the time for negotiation with the carrier takes place. Take for example the case where a carrier offers 3 GB and 5 GB plans but the average usage for the pool is 3.3 GB. In such cases, the 5 GB plan is typically needed to meet the needs of the users without going into overage, but knowing the actual usage profiles will allow one to demand that the carrier offer a 3.5 GB plan for at a lower cost than the 5 GB plan. Knowing the usage and the optimal plan type is very beneficial for such negotiations.

The plan calculation is typically run a few days before the scheduled end of the billing cycle but can be run anytime and as many times as desired. To obtain the actual usage, the system gathers unbilled usage reports from the carrier through and API interface. This usage may also be obtained through a direct API or data feed from the underlying devices. This report will vary from carrier to carrier but at a minimum it will give the usage to-date of the plan allowing the estimation of usage from the current period of time to the end of the plan. It is by using this method that we are able to determine where we are in the pool and whether or not we must adjust the plans.

In many cases, no changes are required, but in cases a plan change is necessary, once we have a recommended plan change the carrier system may be accessed through a programmable API to make the changes on behalf of the client. The timing of when the system is run should account for things such as communications errors or maintenance related down time and typically a few days before the billing cycle give sufficient time for these conditions and allow for a reasonable estimate of predicted usage at the end of the billing cycle.

It should also be noted that unlike voice pools which encompass all users at a customer, Carriers will allow multiple pools of data to be created for a given customer user group. This is beneficial as there may be only a few users that take the most data and allowing this flexibility allows one to move these users to unlimited plans or to put then into a single high use pool which will be higher cost (instead of having to drive up the overall pool for all users). This flexibility allows for additional savings but also makes the analysis more complex to determine which combinations of users should go into which (and how many) pools to have the optimal savings.

The system also allows for flexibility in configuring margins and buffers for the end customer. Since overage charges are so high, not all customers want to take the risk of unexpected overages by configuring the system to plan for the exact amount of expected usage. For example, if at two days before plan end we calculate the usage to be 100 GB for the pool and adjust the pool accordingly, if the usage is 100 GB or below we will have made the most economical choice of plans. If however on the last two days usage is higher than expected it is conceivable that an overage charge will occur. To mitigate this, the system allows for a configurable buffer to be added and a user may decide to add a 1%, 3% or even 5% buffer for usage to account for any bursts of usage that could lead to an overage. As the system runs and we see month over month that we are always within 1% for example, a user may reconfigure this buffer to align with the past performance and expected results. Prior to this, as mentioned in the background section, customers had become accustomed to adding a 20% buffer to manually calculated expected usage. Even if working with a buffer of 5%, this is a clear 15% savings on one's bill and a significant benefit.

Finally the system also keeps a record of all changed made in the system along with acknowledgements from the carrier system for changes made. When the carrier invoices are received, a reconciliation process is run to ensure that the appropriate changes were made when expected and that the charges match what is expected based on the new plans selected. Should these not match, a dispute can be created with the carrier and since all the records and acknowledgements are kept, there is typically no resistance from carriers to adjust the invoice to the expected and appropriate amount.

A discussion will now be presented with respect to the calculation of pools and how devices are moved in and out and between various types of data pools.

Information is gathered from the carrier systems through API (Application programming interfaces) or RPA (Robotic Process Automation) about the real time or near real time data consumption of the devices that are used at a carrier. In addition, the plan catalog detailing the available plans for each line based on the device type is obtained from the carrier by programmatic means or through import. The above information allows us to understand which devices are present, the device types, the available plans for these devices as well as the current utilization within the plan period of each of these devices.

Next pools are isolated by grouping the devices in each pool and the current data utilization as well as the current pool allotment is calculated from the individual device data and the available plans from the carrier catalog for each device in the pool. As outlined previously, plans may be specific to device types and some plans may not be pool eligible.

With the available data, a pro-rated expected usage is calculated based on the usage trends for the devices in the pool. This is done by taking the current utilization in month and based on the number of days remaining, extrapolating and predicting the expected end of month usage for each device, and adding these up for the poll encompassing all devices. In some cases, this may now show a potential overage to the allotted pool allowance, in other cases, it may show an underage. It will almost never be exactly the allowable amount but the optimization algorithm is run to determine if cost reduction is possible. Even if there is minimal overage or underage, the plan catalog may have changed and new options may be available for devices which may optimize costs.

For each set of plan profiles, we separate the devices into groups that can pool and cannot. For those that cannot, a simple optimization at a single device level is run to find the best plan for the device. These device are later revisited to see whether or not additional savings can be had by placing them in a pool eligible plan assuming there is room in the pool to add them. The immediate optimization that takes place is to find the right sized plan for the device.

It should be noted, that while plan optimization is taking place, this is all done as calculations and no plan changes are actually started until the complete optimization is done. Throughout the calculation and optimization process, it is possible that devices are moved around multiple times to multiple plans in order to determine the best and most optimal overall configuration.

If the device and plan profile is pool eligible and pools with a single pool, we take the overall pool average over a three month period, including the current month, and add a configurable buffer to determine the amount needed in the pool for that device. This is repeated to have the desired value for the pool as a whole with the current devices that are allocated to it. At that point, available plans are cycled though to come up with the most cost efficient plan for each device based on available plans for that type that reduce the overall pool cost. Plans for each device type are ranked by a cost efficiency metric and this aids in cycling through the list. This also optimized the calculation as it is not necessary to run through all permutations but rather, the system goes through by ranking and when the next selection does not reduce the cost, we are certain that additional changes beyond the last selection will simply add cost and we can stop searching plans for that device.

As a concrete example, say we rank available plans for a particular device type in order of efficiency and have 1 GB, a 10 GB, and a 3 GB, 5 GB, and 7 GB available plans. In this case, if a pool of 100 devices has used 101 GB, we may opt to put everyone in the 1 GB plan and realize that we have 1 GB overage. We can also calculate the cost including the overage amount of the extra 1 GB in overage charges, but it is generally accepted that an overage cost is higher than a plan switch and this is a configurable option that may only minimally affect areas where overages are very small.

Continuing with the example above, if we select the next plan in terms of efficiency we move one device to a 10 GB plan see that we are no longer over the allotment and determine the cost. We then also try moving the one user to the 3 GB plan and find that the cost is lower and we are no longer over. We next try moving the same user to the 5 GB plan and also see we are no longer over but the cost is now higher. There is no further need to try the calculation with the 7 GB plan as we have ranked the plans in order and we have the optimal plan selection of 99×1 GB and 1×3 GB.

In another example, if the same pool of 100 users is not at 108 GB, we may run through the same test and in this case we would iteratively come to groupings that would include most users on a 1 GB plan but combinations including: 96×1 GB+4×3 GB=108 GB, 98×1 GB+2×5 GB=108 GB, or 99×1 GB+1×10 GB=109 GB. We may find that since the cost efficiency ranks the 10 GB plan higher than the others, that the single 10 GB plan added may cost less that two 5 GB plans or four 3 GB plans.

In yet another example, if we moved to a larger data usage like say 150 GB for the 100 users, here the most likely scenario would follow closely again with the cost efficiency in that 6 users with 10 GB plans and 94 users with 1 GB plans (for a total of 154 GB) would likely be the most economical choice, although the actual plan pricing will determine the optimal mix. These examples are just for illustrative purposes that in some cases we can have more data allocation for less cost.

In some cases, an enterprise may have multiple pools, each of which as a current allowance (calculated as above by the current plans and the number of devices) and it may also have a maximum amount of spots. Here, we can also have to calculate the cost of adding users to the pool in terms of a per GB cost.

For each of the pools in question, if the pool is showing that it is over its limit, we would first try to optimize the plans in the single pool as described above, failing this we would attempt to move users out of the pool into an open slot in an available pool or outside of the pool to reduce the usage in the given pool to be within the allowable limits and avoid an overage cost. If insufficient room for the largest user exists, the next user is selected and we try to move them into the pool, and so on. The idea is to balance each of the pools to be within their given limits without making changes to the pool limits or allocation. I this is not possible, then the costs of adjusting the pool are calculated and the lowest cost option is selected. The system will weigh all options to determine the most cost effective move, whether that is placing a user into the account pool, into an unlimited plan, increasing the pool size, or create a new pool with one or more users. The algorithm is repeated until all of the existing or newly created pools are within their limits and none are predicted to have an overage.

If on the other hand, pools are under their allowance, the same calculations are done but in this case, the attempt to lower the group size and to move users to lower plans are made until we have reached the minimum pool sizes. In another example where we have the lowest available pool eligible plan of 1 GB but the overall plan utilization of 100 users is only 50 gb. We would take the smallest users now, and move them into available low cost plans out of the pool. If out of the 50 GB we had 50 users that did not use any data at all, assuming we wanted to keep these lines active, which often in these unused scenarios is not the case, we could remove the 50 lines out of the pool and have 50 users using the data in the pool and 50 very low cost lines. Here we would start with the lowest users instead of the highest ones in the case of overages.

In some cases, multiple carriers are used, and this same mechanism is performed at a per carrier level although the notion of carrier coverage and availability may be used to also determine moving users from one carrier to another for further optimization. In other cases, plans which are currently being used are no longer in the catalog but have been grandfathered, this may provide special consideration when it comes to moving these users away from these plans and other users may be selected instead if the grandfathered plans are beneficial compared to currently available plans Once the calculations are completed and the new allocation of plans, devices, and pools is complete, the system will instigate the changes at the carrier by moving the appropriate users to the appropriate plans and pools before the billing cycle is complete thus obtaining the most cost effective solution for the enterprise.

Figure 1B:
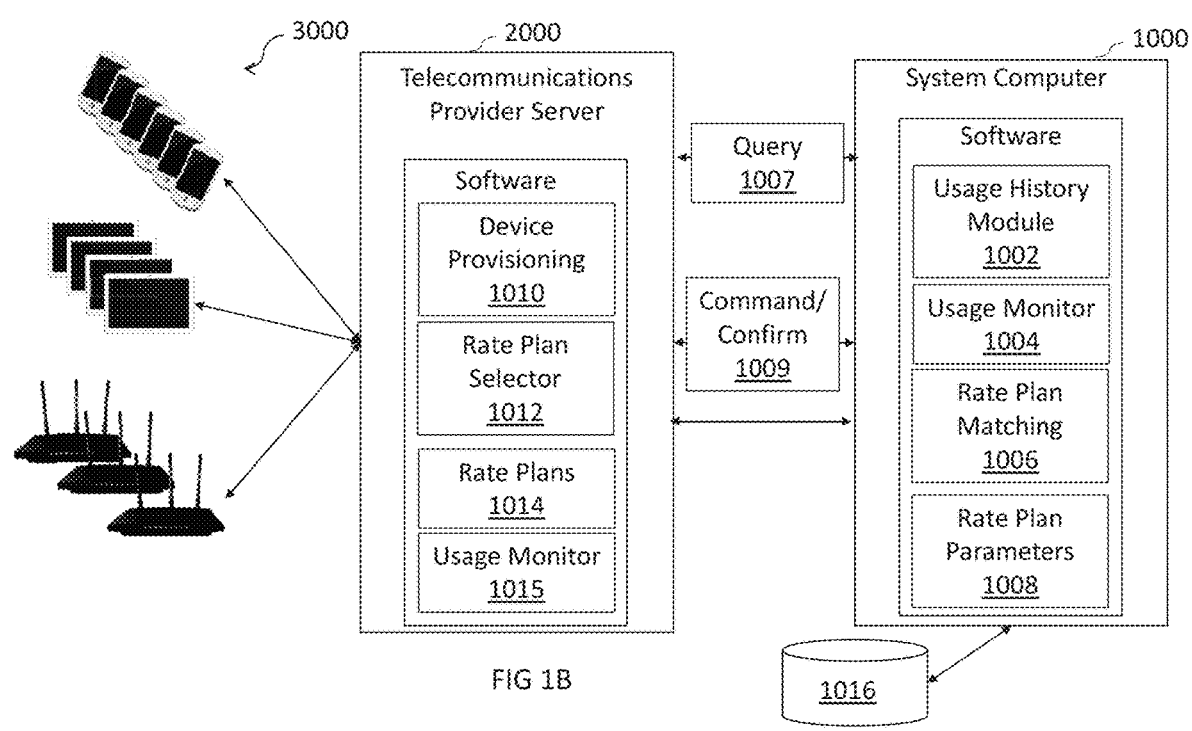
FIG. 1B is an alternative block diagram according to the present invention.

Referring to FIG. 1A, the system computer 1000 is shown in communication with the telecommunications provider server 2000 and a number of devices 3000 (which may be of different types). It is also understood that the system computer 1000 may be in communication with the devices 3000 via the telecommunications provider server 3000 in that the devices 3000 communicate with the telecommunications provider server 2000 and the system computer 1000 receives associated data through such server 2000 (See FIG. 1B).

The system computer includes a usage history module 1002 which can be used to determine historical usage of each device 3000 in order to forecast likely usage variances by querying 1007 the telecommunications provider server to obtain a variety of data including usage, available rate plans and device types. This forecasting can be done in conjunction with usage monitor 1004 which receives data usage information from the devices 3000 or the telecommunications provider server 2000 so that expected usage can be determined. This expected usage can be based on a current billing cycle in that, for example, 25 days into a 30 day billing cycle, if 2.5 GB have been used, it would be expected that 3.0 GB would be used by the end of the billing cycle. However, this expectation can be modified based on other factors which look back further in the past. As but one example, if the 5 days remaining are weekdays where the particular device tends to be connected to Wi-Fi, then 0.5 GB would be expected to be used based on the patterns of the particular device. However, if the device tends to use most of its data on weekends, the history 1002 can be looked at to determine if a weekend will occur in the last 5 days of the cycle and then adjust the expected usage accordingly. In addition, as expected usage is calculated more times for subsequent billing cycles, a range of variances between expected and actual usage can be determined such that a variance can be included in the expected usage to avoid overage charges in the event that the variance is high. In addition, the rate plan matched 1006 for the device can have a safety factor built in such that e.g. if the expected usage is 3.0 gb, and a 3.0 and 5.0 gb plan are available, the 5.0 gb plan would be selected. However, this may not hold true for all devices in the pool in that if every device with an expected usage between 2.7 and 3.0 gb were given a 5.0 gb plan, there would be many multiples of excess amounts of data available for these to share, thus the expected variances and safety factors can be more closely tailored as the pool grows since the likelihood that each and every device will go to the high end of the possible variance would be of a relatively low probability (which can also be determined and accounted for when selecting plans). The rate plan matching 1006 takes the expected usage determined based on the history module 1002 and the usage monitor 1004 and looks at rate plan parameters 1008 which are determined from a catalogue in storage 1016 and/or rate plans 1014 at the telecommunications provider server 2000. These rate plans may be obtained through an API with the provider server 2000 which the system computer 1000, specifically the rate plan parameters 1008 module can convert in to a standardized format for easy comparison and storage 1016. When the rate plan matching 1006 is done, the system computer 1000 communicates with the telecommunications provider server 2000 (specifically the rate plan selector 1012) with commands/confirmations 1009 in order to modify the rate plan for one or more of the devices 3000 in order to better optimize the pool and device plans to reduce costs. It is understood that this modification of the rate plan can be done and requested in a retroactive manner. In this way the example of a monitoring event 5 days before the end of the billing cycle can be done so that overages do not occur and costs are minimized.

FIGS. 2A and 2B show some examples of how rate plan matching is done for a relatively small pool of devices. The "No Pool" example is shown where all devices are not associated with a pool and each device is set to have enough data to avoid an overage charge. Namely, Devices A and B both have 3 gb plans (2.9 and 2.0 of usage), device C has a 2 gb plan (1.5 of usage) and so on. It is also understood that the "No Pool" can also be pooled, but minimally adjusted in that each device is adjusted based on its usage as opposed to usage of the overall pool. As explained previously, the estimated usage would be determined e.g. 5 days before the end of the cycle and that calculation would indicate the usage numbers shown on the graph (2.9 for A through 0.5 for F). With these estimated usage values (which may or may not incorporate a safety factor/variance as described above), the pool can be adjusted down. The total expected usage is 8.65 gb. The pool is adjusted such that some devices will actually go over their expected data usage (e.g. device C), but the total usage allotted the pool is 9 gb. As can be seen, the majority of users are assigned a 1 gb plan which may have been determined to be the lowest cost per gb. It is conceivable that of the available plans (e.g. 1 gb, 3 gb, 5 gb, 10 gb), the best cost per gb may be the 1 gb and then the 10 gb plan. Thus, turning to FIG. 2B and example is shown where the pool has higher total usage. In this case, the total usage is 23.4 gb with device A being over the maximum pooled plan allowable of 10 gb. Thus, in the no pool/not adjusted example, device A is on an unlimited plan outside the pool and devices B-F are on pooled plans which ensure they do not go over their usage. However, in this example, the 5 gb and 3 gb plans may be more costly per unit of data as opposed to e.g. the 1 gb and 10 gb plans. Thus, the adjusted pool has two devices (A,D) on a 10 gb plan and the remaining devices on a 1 gb plan. In this manner, there is 24 gb available for the pool to use and the difference between the total expected usage (23.4 gb) and the available data (24 gb) is minimized. It is understood that the system will iteratively go through the available plans based on a difference in available data and expected usage in order to minimize costs, which will often (but not necessarily) involve the difference between expected usage and available data being minimized. As another example, if device B in FIG. 2B utilized 7.0 gb, the system would need to find another 3 gb in data availability. Adding a 10 gb plan may be less expensive per gb but result in a higher cost as compared to two of the 1 gb plans being modified to 3 gb plans to result in adding 4 gb more of capacity to the pool. The other option would be to switch one device to a 5 gb plan to have the same amount of additional capacity available. The system could try both configurations (among others) and determine which is less expensive overall.

Figure 3:
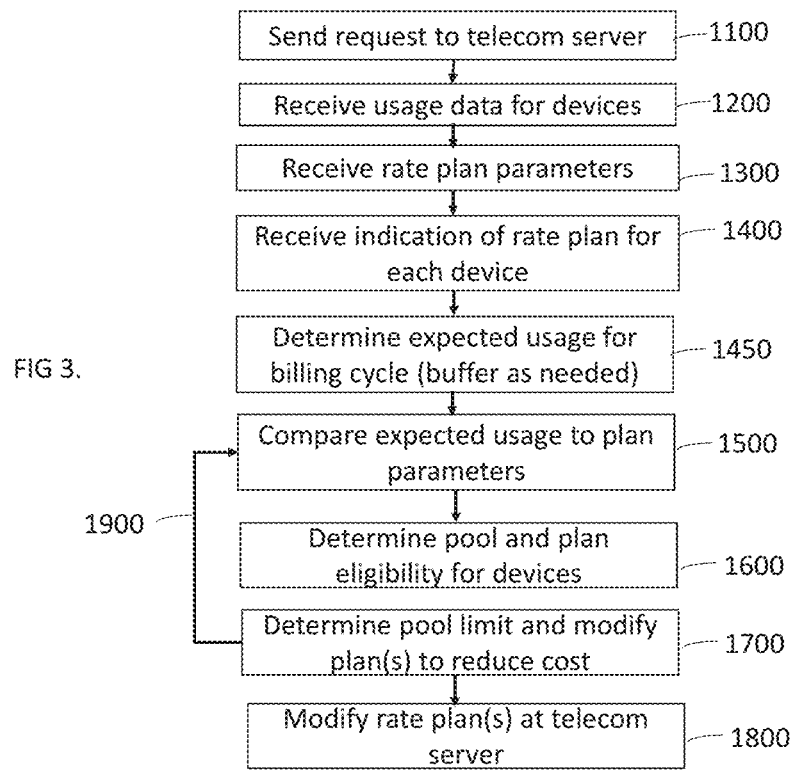
FIG. 3 is a flow chart of an embodiment of the system and method according to FIG. 1A-B.

Referring to FIG. 3, an example computer implemented software process flow is shown where a request is sent to the telecom server 1100 in which various information is requested. In response usage data from the devices 1200 is received along with rate plan parameters 1300. It is also understood that rate plan parameters can be pulled from the storage 1016. These parameters can include a number of indications on the plan. For example, its data (or other usage) limits, cost, available devices/device types and its eligibility for pooling. Overage charges may be indicated as well in that these overages may be plan specific or carrier specific. These can be part of a particular plan's parameters or a separate "plan" in that the overage plan is itself a plan with defined limits and charges. In some instances, these parameters can further include an indication of pool eligibility and any pooling restrictions. For example, the carrier may set up plans that have a given amount of total data for a given amount of users. A pool may have a maximum of 50 devices allowed in the pool with 150 gb of total data allotted.

Based on the available plans received 1300 and the plans currently enabled for the various devices 1400, it is now possible to determine how to optimize and in turn how to modify plan selection for the various devices. With the data 1200 received, the expected usage for a particular billing cycle can be determined by the software. 1450. This expected usage will often be determined towards the end of the billing cycle when carriers allow for retroactive modification of the rate plans. As an example, the expected usage 1450 is determined 5 days before the cycle ends. In this manner, 25 days of the cycle are already over and that usage is known and usage over 30 days can be extrapolated by measuring the total gb used by day 25 and then knowing the average gb/day for that cycle. Thus, a straight line projection 1451 (FIG. 2A) can initially be calculated. A buffer may be added in based on user selection, for example 1%, 5% or other amount of extra data that should be available either per device or for the overall pool, depending on risk tolerance and this would modify the straight line projection 1451. Other modifications based on historical data can be used to adjust the straight line projection 1451. The projection 1451 although shown as a straight line, may not necessarily be straight and may be based on a number of factors to more accurately predict the expected usage and allow buffers.

With the devices and their current plans known as well as available plans also known, the expected usage for each device is added together in the pool(s) and compared 1500 to the parameters of available plans as opposed to current plans. If the per gb cost of the plans tends to vary, the system will trend towards plans which are logically expected to be less expensive. Thus the eligibility of plans and devices for various pools is verified 1600 and the pool limit is checked against expected usage 1700. The system then iteratively 1900 modifies the plans selected. Once the cost is minimized, the rate plans are modified at the telecom server 1800, preferably in a retroactive manner. In this way, since e.g. 25 days in the cycle are finished and only 5 are left, the likelihood of an overage is relatively low and the costs of the plans are minimized and modified automatically by the monitoring software.

Figure 4:
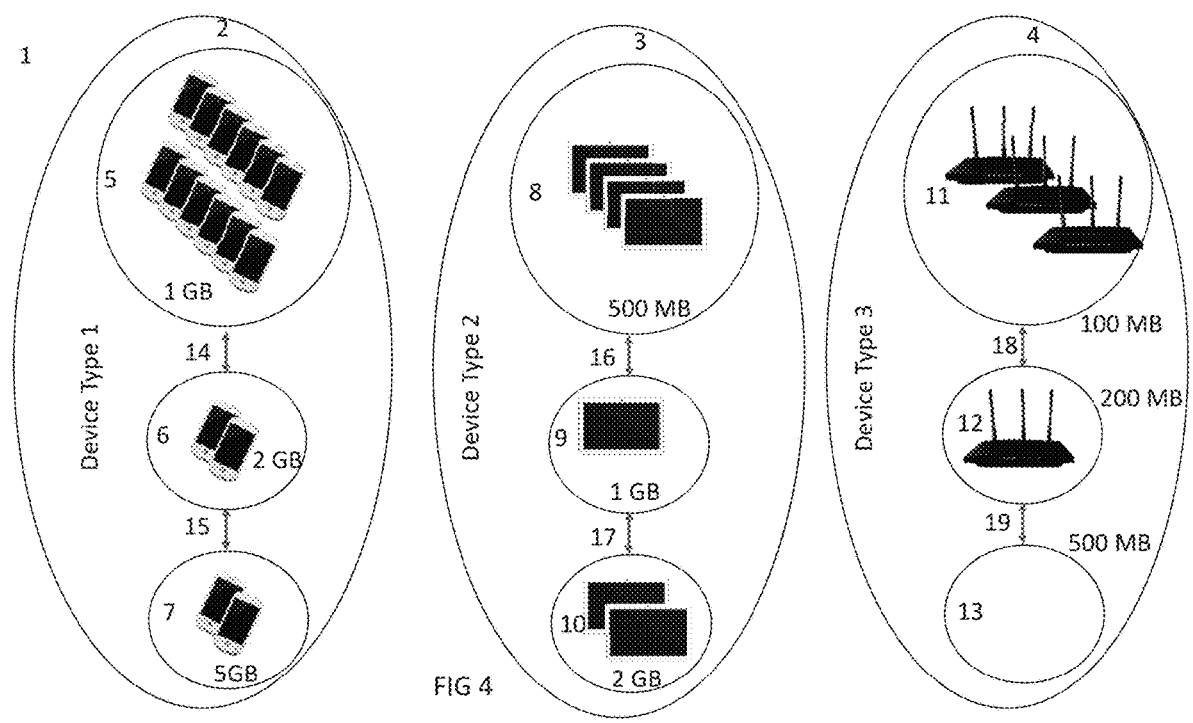
FIG. 4 Depicts an example of available plans for different devices types within a pool.

FIG. 4 shows example of available plans for different devices types within a pool. In looking at the pool (1) we can see that it consists of various device types (2,3,4) and different plans for each of the device types (5,6,7, 8,9,10, 11,12,13), Looking at FIG. 4, consider that the overall pool (1) is the sum of data plans assigned to all the devices of all types. Looking at device type 1 (2) we can see that or this device type, some devices are in a 1 GB plan (5), whereas other devices are in a 2 GB plan (6), and still others are in a 5 GB plan (7). These are the only plans available for devices of device type 1.

Similarly looking now at device type 2 (3), we see that these devices depicted as tablets also have three available plans and some of these are in a 500 MB plan (8) where as others are in 1 GB plans (9) and 2 GB plans (10). The plans (8,9,10) are the only plans available in the pool for device type 2.

As a further illustration looking now at device type 3 (4), we see that these devices depicted as modems also have three available plans and some of these are in a 100 MB plan (11) where as others are in 200 MB plans (12) and in this illustration we see a 500 MB plan (13) is available but has no devices in it at present.

Turning back to device type 1 now, we can see that for any of the devices of device type 1, they can move between plans such that devices in the 1 GB plan (5) can move (14) to the 2 GB plan (6) and devices in the 2 GB plan (6) can move (15) to the 5 GB plan (7), Similarly, devices in the 5 GB plan (7) can move (15) to the 2 GB plan (6) and devices in the 3 GB plan (6) can move (14) to the 1 GB plan (6). These moves can be done based on adjustments based on the actual usage of devices.

The same is true for devices of types 2 (3) and 3 (4). In these cases you can note (16,17) and (18,19) as the paths by which devices can move from plans (8,11) to (9,12) and from (9,12) to (10,13) respectively, Again devices can move either up or down between the plans as outlined for device type 1.

One should note that the plans offered for device type 1 are distinct from the plans offered for device types 2 and 3. Even if the data amounts may be the same amount, these plans are different entities and may have different price points. In such an example, to obtain the overall data allocation for the pool (1) one would add up the data plan of each device in the pool. In the example shown, we can see that there are two devices of device type 1 (2) in the 5 GB plan (7) and thus these two devices would contribute 10 GB or 5 GB each towards the pool. When looking at all the devices of device type 1 we can see that there are also 2 additional devices in the 2 GB plan (6) which would in turn contribute 4 GB or 2 GB each towards the pool. Finally, for device type 1 we also see 12 devices in the 1 GB plan (5) which would in turn contribute 12 GB or 1 GB each towards the pool (1). Thus, the total contribution to the pool from all devices of device type 1 would be 26 GB as we add up three 12 GB, the 4 GB and the 10 GB totals of each plan type.

Doing the same exercise for device types 2 (3) we can see in the depicted example 4 devices of device type 2 in the 500 MB plan (8) contributing 2 GB, a single device in the 1 GB plan (9) contributing another 1 GB and two devices in the 2 GB plan (10) adding another 4 GB. Thus, the total contribution for device type 2 devices to the overall pool (1) would then be 7 GB as we add up the 2 GB, 1 GB, and 4 GB totals of each plan type.

Similarly, for device type 3 (4) we can see in the depicted example 3 devices of device type 3 in the 100 MB plan (11) contributing 300 MB, a single device in the 200 MB plan (12) contributing another 200 MB and no devices in the 500 MB plan (13). Thus, the total contribution for device type 3 devices to the overall pool (1) would then be 500 MB as we add up the 300 MB, 200 MB, and 0 MB totals of each plan type.

Looking now at the overall pool (1) we would take the totals of each of the device type contributions calculated above to be an overall total for the pool of 33.5 GB consisting of 26 GB from the device type 1 devices, 7 GB from the device type 2 devices and 500 MB or (0.5 GB) of device type 3 contributions.

Figure 5:
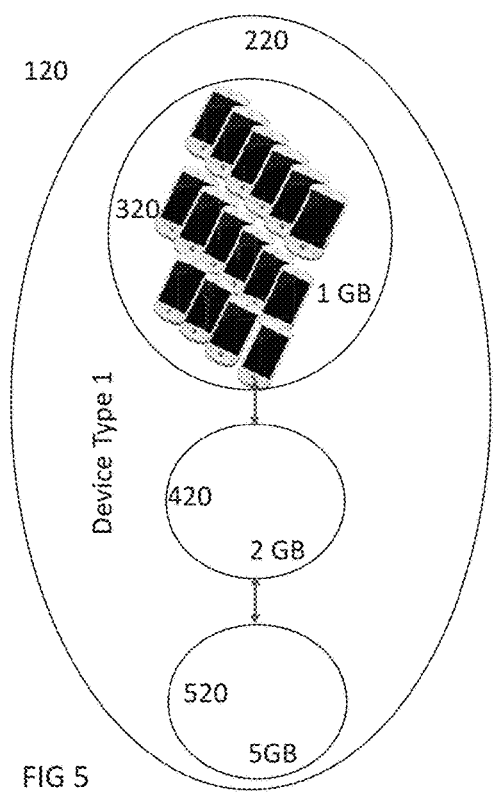
FIG. 5 Depicts a sample minimally adjusted pool.

Turning now to FIG. 5, we see a simple Minimally adjusted pool. In this case the pool (120) consists of a single device type (220) which is device type 1. This is done for simplicity for the example. In this case, three plan types are available, a 1 GB plan (320), a 2 GB plan (420) and a 5 GB plan (520). As we can see in the example, all devices are currently in the 1 GB plan (320) and thus the plan is minimally adjusted.

In this example we see the same 16 devices as were depicted in FIG. 4 but in this case, all the devices have been moved to the 1 GB plan. In such a case the overall contribution to the pool (120) of device type 1 devices (220) is a total of 16 GB. This plan can no longer be adjusted downwards as no smaller plans are available and thus the plan is considered minimally adjusted.

Figure 6:
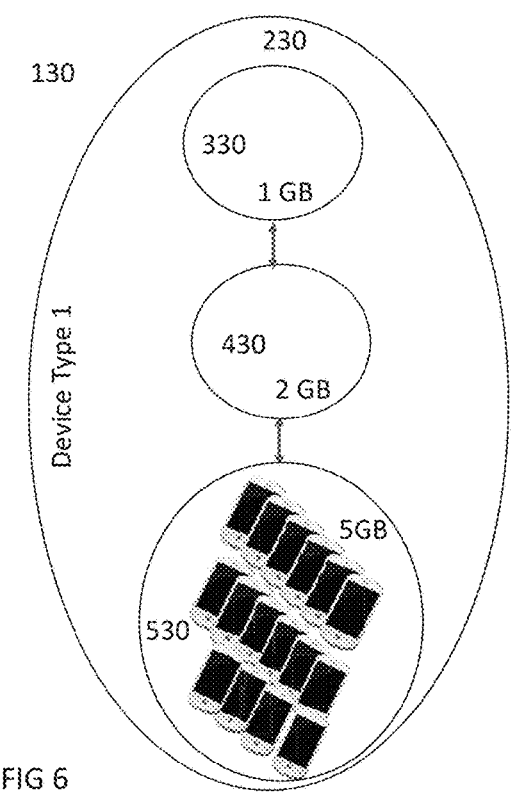
FIG. 6 Depicts a sample maximally adjusted pool.

Turning now to FIG. 6, we see a sample maximally adjusted pool. In this example, the pool (130) consists again of a single device type, device type 1 (230) and this device type has three possible plans available to it, a 1 GB plan (330), a 2 GB plan (430) and a 5 GB plan. In our example, we can see that all of the 16 devices of device type 1 (230) are in the 5 GB plan (530). The total contribution to the pool (130) of device type 1 in this example would be 80 GB or 16 devices of 5 GB each. Again, as no larger plans are available, the pool would be considered maximally adjusted.

Turning now to FIG. 7, we see again a sample pool (140) which in the simplified example is made up of a single device type (240) consisting of device type 1. Within the pool, three plans are offered for device type 1 (240) and these are a 1 GB plan (340), a 2 GB plan (440), and a 5 GB plan (540). Devices can move up to the 5 GB plan from the 2 GB plan (940) and down to the 1 GB plan from the 2 GB plan (840) as well as moving up when their usage goes up or down. However, the 5 GB plan (540) is the maximum plan allowed in the pool and the 1 GB plan (340) is the minimal plan allowed in the pool In FIG. 7 two additional plans are introduced consisting of an unlimited plan (640) which is outside of the pool (140). While this plan is available for device type 1, it is not pool eligible and devices using this plan cannot be part of the pool.

Similarly, another plan, a reduced plan (740) is introduced also for devices of device type 1 but again this plan is not pool (140) eligible and devices using this plan cannot be part of the pool.

We see that one device has been moved out of the pool (140) from the 5 GB plan (540) to outside of the pool (1040) into an unlimited plan (640). In such a case, the unlimited plan is paid for separately from the pool and the pool is reduced by one device and also is reduced in cost. The example pool is reduced by 5 GB in overall data as we are removing one device that had a 5 GB plan. The remaining data is now shared by the remaining devices in the pool.

Similarly, we see that two devices have been moved out of the pool (140) from the 1 GB plan (340) to outside of the pool (1140) into a reduced plan (740). In such a case, the reduced plan is paid for separately from the pool and the pool is reduced by two devices and also is reduced in cost. The example pool is reduced by 2 GB in overall data as we are removing two devices that had a 1 GB plans each. The remaining data is now shared by the remaining devices in the pool.

Figure 7:
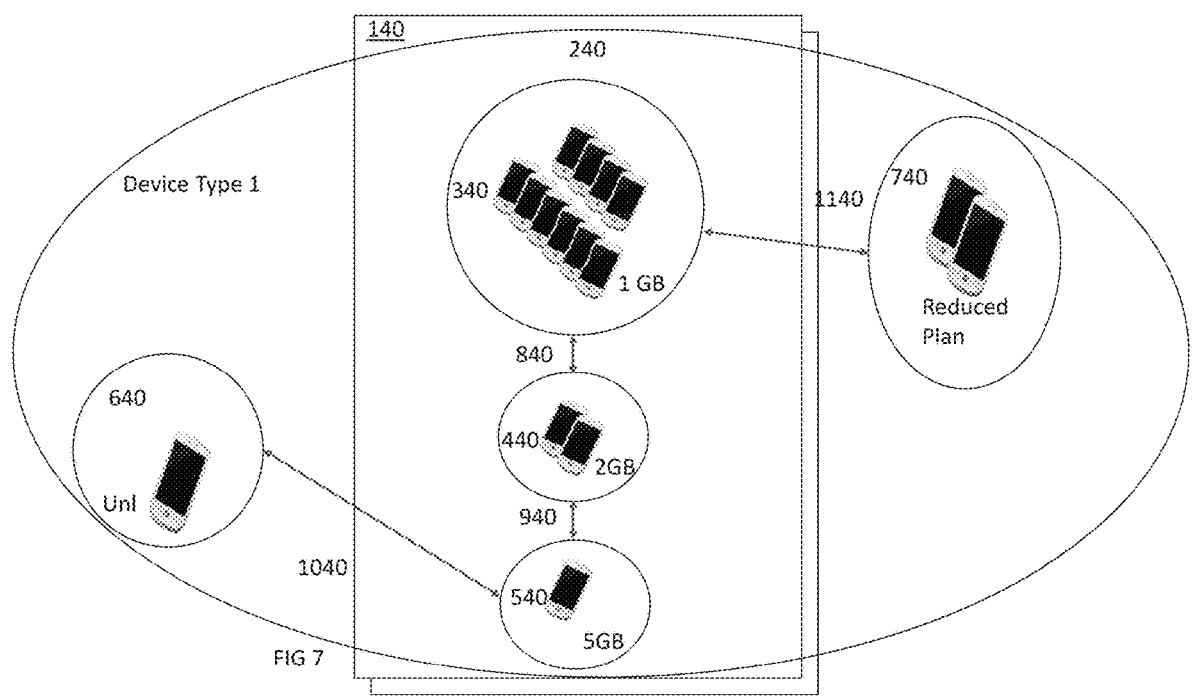
FIG. 7 Depicts moving high and low users out of the pool to individual plans.

FIG. 7 also shows that there could be more than one pool 140 such as the previous example of a 50 device maximum pool for 150 gb of data. This device number limited pool may be a better cost/gb as opposed to the plans which may not be limited in number of devices. In this manner, getting devices into these pools would be expected to be the more cost effective manner of doing this, however, the limit on devices is another iterative variable which needs to be balanced in that if the devices with the highest usage are added to the pool, it is possible that there will be an overage charge, thus the top users may be moved out of the device number limited pool or if there are many devices using low amounts of data, adding the high users into a pool with the lower users can balance the two out.

It is also understood that the optimal balance of plans could include certain devices being in non-pooled plans. For example, devices which use very little or lots of data can have unlimited plans for the large users and small plans which are not pooled for the lower users. Thus, the system can iteratively determine which plan options provide the best cost savings for the expected usage for a given billing cycle.

Figure 8:
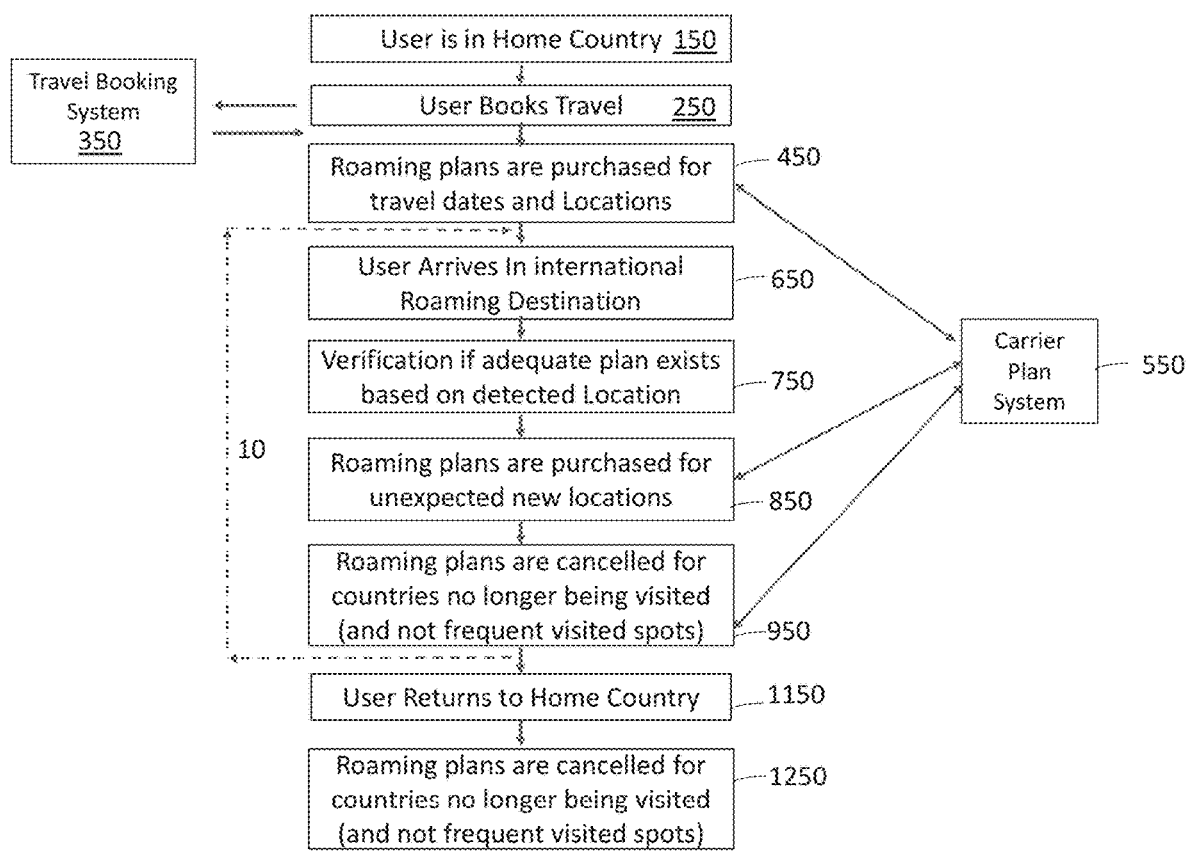
FIG. 8 Depicts adding or removing international travel plans based on the travel location.

Turning now to FIG. 8, we see the typical flow of dynamically assigning roaming plans to a user device as it moves between countries to ensure adequate coverage. Initially, the device is in the home country (150) and the user or travel agent books travel for the associated user (250) which is detected from the travel system (350). In this case, typically a date and location are known ahead of time, and the plan can be purchased and put in place (450) from the carriers' system (550).

The system is able to detect location dynamically and when the device arrives or is powered on in an international location (650) a check is done to verify that a plan was purchased and is active for that location (750). If for some reason the location is unexpected and/or no roaming plan exists, roaming plans are then dynamically purchased (850) from the carrier system (550). Further, if plans are in place for other locations, and these are not known to be frequent travel locations for the user, these plans are cancelled (950) in the carrier system (550) so as not to entail further fees.

The travel cycle may continue (1050) with the user again arriving or powering up their device in an international location (650) once again. Just as before, a check is done to verify that a plan was purchased and is active for that location (750). If for some reason the location is unexpected and/or no roaming plan exists, roaming plans are then dynamically purchased (850) from the carrier system (550). Further, if plans are in place for other locations, and these are not known to be frequent travel locations for the user, these plans are cancelled (950) in the carrier system (550) so as not to entail further fees.

This cycle may continue as many times as necessary until the user returns to their home country (1150). At that time, plans in place for international destinations known not to be frequent travel locations are cancelled to save on any further unnecessary fees. Frequent travel locations may keep roaming plans active so as to keep longer term more economical plans if they exist for frequent travelers.

Turning now to FIG. 9 we see a typical flow regarding Wi-Fi Networks. The user begins in cellular coverage areas (160) and is connected to the cellular network. When the user arrives at the office location (260) the location is detected from a list of known locations (360) which may be a single office site, or a group of office buildings or locations which are known to have a safe Wi-Fi environment as they are part of the corporate infrastructure. As the user is known to be in this location, the system checks if the user is connected on Wi-Fi and if Wi-Fi is not connected (460) the user is prompted to connect to the known safe Wi-Fi to reduce data usage on Cellular.

In some cases, the user may arrive at a safe partner wi-fi location which may be one hosted by a corporate Wi-Fi program that provides Wi-Fi coverage at multiple locations. This may include airplanes, airports, or coffee shops. Again, if the user is not utilizing Wi-Fi the system can prompt (460) the user to connect so as to reduce data usage on Cellular.

Similarly, if the user arrives at home and the home network has been sanctioned to be safe, the system can prompt (460) the user to connect so as to reduce data usage on Cellular.

Finally, if the user connects to an unsafe Wi-Fi signal (760) that is unknown or not sanctioned the system will prompt the user (860) to connect via a VPN or to disconnect from the network. Here the user would go back to the cellular network (960)

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A system for monitoring telecommunication device usage and modifying telecommunications rate plans and usage pools comprising:

a computer having software executing thereon, said software querying a plurality of telecommunications rate plans to determine rate parameters thereof, at least one of said plurality of rate plans includes a pool of multiple devices which share a quantity of telecommunications resources based on data usage of the multiple devices associated with said pool, wherein each of the plurality of telecommunications rate plans is associated with one or more types of eligible devices for said rate plan;

said software determines a historical usage profile for a plurality of devices and said software, based on the historical usage profile, matching a selection of one or more of said plurality of devices to the pool and transmitting said selection to a telecommunications provider server via a network such that a telecommunications provider associates said selection with the pool, wherein the selection is matched at least in part based on a device type and said software determining that said device type is an eligible device for the selected telecommunications rate plan;

said software monitoring telecommunications usage of the plurality of devices using telecommunications resources and based on the telecommunications usage thereof and the pool to which the plurality of devices are matched, and the software automatically modifying the selection of the one or more of said plurality of devices at the telecommunications provider server via the network based on the monitored telecommunications usage and the rate parameters in order to reduce telecommunications cost for the plurality of devices by modifying the rate plan of at least one of the plurality of devices.

2. The system of claim 1 wherein the software modifying the selection of the one or more of said plurality of devices at the telecommunications provider server makes the modification retroactive to a beginning of a billing cycle for said plurality of devices.

3. The system of claim 1 wherein said software transmits a command to change a telecommunications plan of one or more of the plurality of devices in order to modify the selection of the one or more of said plurality of devices.

4. The system of claim 3 wherein said software receives a confirmation from the telecommunications server in response to said command.

5. The system of claim 1 wherein said software sends a query to one or more telecommunications provider servers in order to query the plurality of telecommunications rate plans.

6. The system of claim 1 wherein the software monitors a rate of change over time in telecommunications usage for each of the plurality of devices and based on the rate of change in telecommunications usage for said selection of the one or more of the plurality of devices as compared to a threshold, said software modifies the selection of the one or more of said plurality of devices, wherein said threshold is indicative of usage during a time period for a billing cycle of a telecommunications provider associated with the pool.

7. The system of claim 1 wherein based on the monitored telecommunications usage an expected usage for each of the plurality of devices is determined and the rate plan for each device is selected such that a sum total of data allotted to the rate plans for the plurality of devices is more than a sum total of expected usage for the plurality of devices but that at least a first one of the plurality of devices uses more data than the rate plan to which the first one of the plurality of devices is associated with.

8. The system of claim 1 wherein said software modifies the selection of the one or more of said plurality of devices by:

said software identifying the plurality of devices associated with an entity and determining a current telecommunications rate plan for each of the plurality of devices, at least two of the plurality of devices associated with said pool;

said software matching a selection of the one or more of said plurality of devices said pool based at least in part on an anticipated reduction in cost for the plurality of devices and a type associated with each of the plurality of devices for said type being eligible for said pool;

said matching by said software modifying which of the plurality of devices are associated with said pool and a rate plan for one or more of the plurality of devices based on the monitored telecommunications usage and the rate parameters in order to reduce telecommunications costs for said plurality of devices such that said software communicates with a telecommunications provider server over a network to implement the modification to the matched rate plan for the one or more of the plurality of devices.

9. The system of claim 1 wherein upon modification of the selection of the one or more devices associated with the pool, said software selects one of the plurality of telecommunications rate plans for a device moved out of the pool.

10. The system of claim 1 wherein upon modification of the selection of the one or more devices associated with the pool, one or more of the devices associated with the modified selection changes telecommunications provider.

11. The system of claim 1 wherein said software modifies the selection of the one or more of said plurality of devices by:
said software determining a current rate plan from said plurality of rate plans for each of said plurality of devices and further determining which of said plurality of devices are associated with said pool and which of said plurality of devices are not associated with said pool, if any;
said software, based on a selected time in a billing cycle for a telecommunications provider associated with the telecommunications server, determining an expected usage for the plurality of devices for the billing cycle based on usage which has occurred between a beginning of the billing cycle and the selected time;
said software determining from the plurality of rate plans, a selected rate plan for each of the plurality of telecommunications devices associated with said pool by iteratively modifying one or more of the selections until a cost based on the expected usage is minimized.

12. The system of claim 1 wherein modifying the rate plan of at least one of the plurality of devices includes adding a roaming plan or removing a roaming plan for one or more of the plurality of devices.

13. A system for monitoring and modifying telecommunications usage pools for telecommunications devices comprising:
a computer having software executing thereon, said software querying a plurality of telecommunications rate plans to determine rate parameters thereof, at least one of said plurality of rate plans relates to a pool of multiple devices which share a quantity of telecommunications resources based on usage of the multiple devices associated with said pool;
said software identifies a plurality of devices associated with an entity and determines a current telecommunications rate plan for each of the plurality of devices, at least two of the plurality of devices associated with said pool;
said software monitoring telecommunications usage of the plurality of devices using telecommunications resources and based on the telecommunications usage thereof, matching a selection of the one or more of said plurality of devices said pool based at least in part on an anticipated reduction in cost for the plurality of devices and a type associated with each of the plurality of devices with said type being eligible for said pool;
said matching by said software automatically modifying which of the plurality of devices are associated with said pool and a rate plan for one or more of the plurality of devices based on the monitored telecommunications usage and the rate parameters in order to reduce telecommunications costs for said plurality of devices such that said software communicates with a telecommunications provider server over a network to implement the modification to the matched rate plan for the one or more of the plurality of devices.

14. The system of claim 13 wherein the implemented modification is made effective as of a beginning of a billing cycle associated with the monitored telecommunications usage for the billing cycle which has not yet ended.

15. The system of claim 13 wherein said software matches a plurality of device types to different rate plans which are associated with the same pool such that at least one device type is ineligible for at least one of the rate plans associated with the same pool.

16. The system of claim 15 wherein said type is determined by said software communicating with each of the plurality of devices over a network to determine an operating system associated with each device.

17. The system of claim 13 wherein the software monitors a rate change in telecommunications usage per time for each of the plurality of devices and based the rate change in telecommunications usage for said selection of the one or more of the plurality of devices as compared to a threshold, said software modifies the selection of the one or more of said plurality of devices, wherein said threshold is indicative of usage during a time period for a billing cycle of a telecommunications provider associated with the pool.

18. The system of claim 13 wherein the modification to the matched rate plan for the one or more of the plurality of devices includes adding a roaming plan or removing a roaming plan for one or more of the plurality of devices.

19. A system for monitoring and modifying telecommunications usage pools associated with devices, comprising:
a computer having software executing thereon, said software in communication with a telecommunications server in order to receive data therefrom, said data indicative of telecommunications usage of a plurality of telecommunications devices;
said software querying a plurality of telecommunications rate plans to determine rate parameters thereof, at least one of said plurality of rate plans relates to a pool of multiple devices which share a quantity of telecommunications resources based on usage of the multiple devices associated with said pool;
said software determining a current rate plan from said plurality of rate plans for each of said plurality of telecommunications devices and further determining which of said plurality of telecommunications devices are associated with said pool and which of said plurality of telecommunications devices are not associated with said pool, if any;
said software, based on a selected time in a billing cycle for a telecommunications provider associated with the telecommunications server, determining an expected usage for the plurality of telecommunications devices for the billing cycle based on usage which has occurred between a beginning of the billing cycle and the selected time;

said software determining from the plurality of rate plans, a selected rate plan for each of the plurality of telecommunications devices associated with said pool by iteratively modifying one or more of the selections until a cost based on the expected usage is minimized.

20. The system of claim 19 wherein the selections are determined by the expected usage is closest to, but without exceeding a sum total of usage allotted said pool based on the rate plans selected.

21. The system of claim 19 wherein the selection are determined by a ranking of charge per unit of telecommunications service usage and based on the expected usage and the ranking, said software selecting a rate plan for each of said plurality of telecommunications devices associated with said pool based on a lowest charge per unit in the ranking and modifying the selection to a higher ranked charge per unit based on the expected usage exceeding a sum total of usage allotted to said pool based on the rate plans selected.

22. The system of claim 19 wherein modifying one or more of the selections until a cost based on the expected usage is minimized includes adding a roaming plan or removing a roaming plan for one or more of the plurality of telecommunications devices.

23. A method of monitoring data usage of a plurality of telecommunications devices and modifying rate plans thereof comprising:
   gathering data usage information via computer with software executing thereon by communicating with a telecommunications server associated with a telecommunications provider, the data usage indicative of data usage of a plurality of telecommunications devices;
   determining via said software a plurality of rate plans available from said telecommunications provider and which of said plurality of rate plans are associated with each telecommunications device, two or more of said rate plans being associated with a pool of shared telecommunications usage and two or more of said plurality of rate plans having a cost and a data limit associated therewith;
   determining based on historical data usage of said plurality of telecommunications devices and a time relative to a billing cycle, an expected usage for said billing cycle;
   automatically modifying one or more rate plans associated with said telecommunications devices based on the expected usage as compared to a sum of data limits for the modified rate plans associated with said telecommunications devices such that a total cost is minimized;
   migrating the devices in and out of telecommunications usage pools in accordance with the modified rate plans at the telecommunications server.

24. The method of claim 23 wherein the data usage information contains historical data usage.

25. The method of claim 23 wherein automatically modifying one or more rate plans includes adding a roaming plan or removing a roaming plan for one or more of the plurality of telecommunications devices.

26. A system for monitoring and modifying telecommunications usage pools associated with devices, comprising:
   a computer having software executing thereon, said software in communication with a telecommunications server in order to receive data therefrom, said data indicative of telecommunications usage of a plurality of telecommunications devices;
   said software querying a plurality of telecommunications rate plans to determine rate parameters thereof, at least one of said plurality of rate plans relates to a pool of multiple devices which share a quantity of telecommunications resources based on usage of the multiple devices associated with said pool;
   said software determining a current rate plan for each of said plurality of telecommunications devices and further determining which of said plurality of telecommunications devices are associated with said pool and which of said plurality of telecommunications devices are not associated with said pool, if any;
   said software, based on a selected time in a billing cycle for a telecommunications provider associated with the telecommunications server, determining an expected usage for the plurality of telecommunications devices for the billing cycle based on usage which has occurred between a beginning of the billing cycle and the selected time;
   said software determining from the plurality of rate plans, a selected rate plan for each of the plurality of telecommunications devices in order to reduce cost based on the expected usage;
   said software automatically transmitting to said telecommunications server the selected rate plan for one or more of the plurality of telecommunications devices such that said transmission causes the selected rate plan for the one or more of the plurality of telecommunications devices to apply to that device with the telecommunications provider retroactively to the beginning of the billing cycle.

27. The system of claim 26 wherein said software transmits a command to change a telecommunications plan of one or more of the plurality of telecommunications devices in order to modify the selection of the one or more of said plurality of telecommunications devices.

28. The system of claim 27 wherein said software receives a confirmation from the telecommunications server in response to said command.

29. The system of claim 26 wherein the one or more of the plurality of telecommunications devices whose selected rate plan is applied retroactively to the beginning of the billing cycle is no longer associated with said pool after the retroactive application of the selected rate plan.

30. The system of claim 26 wherein the selected rate plan for the one or more of the plurality of telecommunications devices whose selected rate plan is applied retroactively to the beginning of the billing cycle is an unlimited rate plan.

31. The system of claim 26 wherein the software monitors a rate of change over time in telecommunications usage for each of the plurality of telecommunications devices and based on the rate of change in telecommunications usage for the telecommunications devices associated with said pool as compared to a threshold, said software modifies which of the plurality of telecommunications devices are associated with said pool, wherein said threshold is indicative of usage during a time period for the billing cycle of a telecommunications provider associated with the pool.

32. The system of claim 26 wherein based on the monitored telecommunications usage an expected usage for each of the plurality of telecommunications devices is determined and the rate plan for each device is selected such that a sum total of data allotted to the rate plans for the plurality of telecommunications devices is more than a sum total of expected usage for the plurality of telecommunications devices but that at least a first one of the plurality of telecommunications devices uses more data than the rate plan to which the first one of the plurality of telecommunications devices is associated with.

33. The system of claim 26 wherein the selected rate plan is determined at least in part by comparing a device type for the one or more of the plurality of telecommunications devices to rate plans for which the device type is eligible.

34. The system of claim 26 wherein the selected rate plan for one or more of the plurality of telecommunications devices causes that device to be moved out of the pool.

35. The system of claim 26 wherein the selected rate plan results in one or more of the plurality of telecommunications devices to change telecommunications provider.

36. The method of claim 26 wherein transmission of the selected rate plan causes a roaming plan to be added or removed for one or more of the plurality of telecommunications devices.

\* \* \* \* \*